US011590589B2

(12) United States Patent
Horsfall et al.

(10) Patent No.: US 11,590,589 B2
(45) Date of Patent: Feb. 28, 2023

(54) KEY CLAMP

(71) Applicant: ICONX INTERNATIONAL LIMITED, Manchester (GB)

(72) Inventors: David Horsfall, Yorkshire (GB); Polly Crowther, Yorkshire (GB)

(73) Assignee: ICONX INTERNATIONAL LIMITED, Manchester (GB)

( * ) Notice: Subject to any disclaimer, the term of this patent is extended or adjusted under 35 U.S.C. 154(b) by 0 days.

(21) Appl. No.: 17/522,667

(22) Filed: Nov. 9, 2021

(65) Prior Publication Data

US 2022/0143717 A1    May 12, 2022

(30) Foreign Application Priority Data

Nov. 10, 2020  (GB) ....................................... 2017736
Oct. 19, 2021  (EP) ..................................... 21203412

(51) Int. Cl.
  *B23C 3/35*    (2006.01)
  *B25B 1/24*    (2006.01)

(52) U.S. Cl.
  CPC .......... *B23C 3/355* (2013.01); *B23C 2260/80* (2013.01); *Y10T 409/300952* (2015.01)

(58) Field of Classification Search
  CPC ............... B23C 3/355; B23C 2260/80; B23C 2235/00–2235/48; B23C 3/35; Y10T 409/301064; B25B 1/241; B25B 1/2405; B25B 1/24; B25B 1/00–1/2494; B25B 5/00–5/166; B23Q 3/06–3/088; B23Q 3/101–3/104

USPC .............................. 409/81–83; 269/265, 257
See application file for complete search history.

(56) References Cited

U.S. PATENT DOCUMENTS

| | | | | |
|---|---|---|---|---|
| 523,311 A | * | 7/1894 | Haven ..................... | B25B 1/103 269/265 |
| 1,866,034 A | * | 7/1932 | Hansen ..................... | B23C 3/35 409/83 |
| 2,734,409 A | * | 2/1956 | Schum et al. .......... | B25B 1/241 269/282 |

(Continued)

FOREIGN PATENT DOCUMENTS

CN    106239392 A       12/2016
DE    19756793 A1  *    6/1999
(Continued)

OTHER PUBLICATIONS

Search Report for British Patent Appln No. GB2114893.7 dated Mar. 30, 2022 (1 page).

(Continued)

*Primary Examiner* — Erica E Cadugan
(74) *Attorney, Agent, or Firm* — Alston & Bird LLP

(57) ABSTRACT

A key clamp for a key cutting apparatus is provided. The key clamp comprises a first jaw and a second jaw. The first jaw comprises an engagement surface having a widthwise dimension and a lengthwise dimension. The engagement surface comprises a first row of serrations, arranged along a lengthwise edge of the engagement surface, and a second row of serrations. The second jaw has an engagement surface comprising a row of serrations for location, in the widthwise dimension, between the first row of serrations in the first jaw and the second row of serrations in the first jaw.

15 Claims, 13 Drawing Sheets

(56) References Cited

U.S. PATENT DOCUMENTS

| | | | |
|---|---|---|---|
| 3,675,916 A | * | 7/1972 | Kartasuk ................ B25B 1/241 |
| | | | 269/282 |
| 2010/0230884 A1 | * | 9/2010 | Nelson ................ B25B 1/2405 |
| | | | 269/265 |
| 2014/0117606 A1 | | 5/2014 | Bronzino |
| 2019/0015908 A1 | * | 1/2019 | Xi .......................... B23C 3/355 |

FOREIGN PATENT DOCUMENTS

| | | |
|---|---|---|
| DE | 202004017336 U1 | 12/2004 |
| FR | 1482132 A  * | 5/1967 |
| WO | WO-02/101180 A2 | 12/2002 |

OTHER PUBLICATIONS

Extended European Search Report for EP Appln No. 21203412.8 dated Apr. 7, 2022 (11 pages).

* cited by examiner

DETAIL G

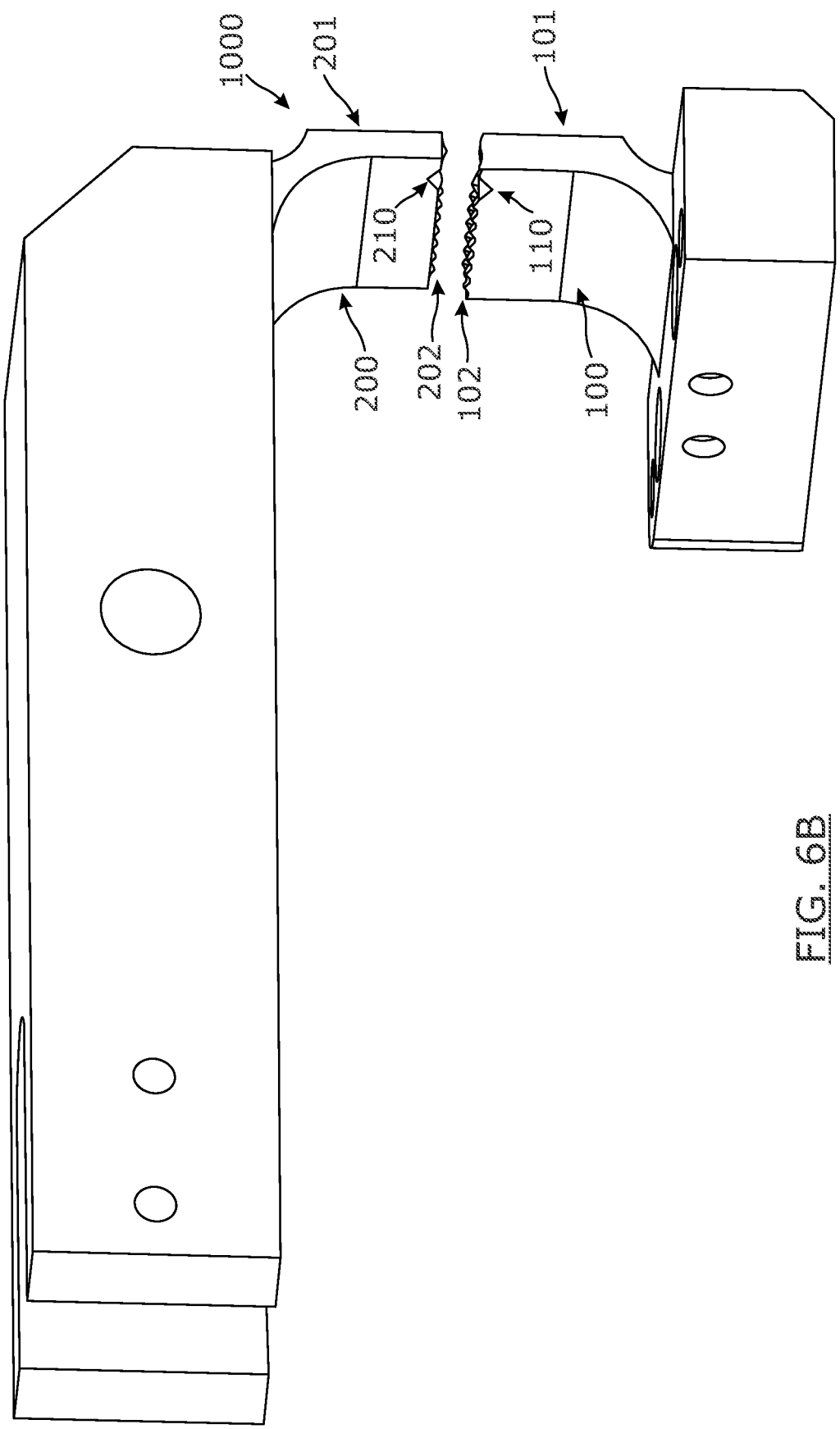

KEY CLAMP

CROSS-REFERENCE TO RELATED APPLICATIONS

This application claims priority to Great Britain Application No. 2017736.6, filed Nov. 10, 2020, the entire contents of which are incorporated herein by reference. This application also claims priority to European Application No. 21203412.8, filed Oct. 19, 2021.

FIELD OF THE INVENTION

Embodiments of the present invention relate to a key clamp. In particular, they relate to a key clamp for use in a key cutting apparatus.

BACKGROUND TO THE INVENTION

An automated key cutting apparatus is configured to cut a key blank to a particular shape in order to replicate a particular key. In some examples, the automated key cutting apparatus may be configured to image a key to be replicated in two or three dimensions in order to determine the shape to which the key blank should be cut.

Keys, and therefore key blanks, come in a variety of shapes and sizes. It is difficult to configure a key clamp to grip a variety of differently shaped key blanks in a consistent way, so as to enable accurate key cutting.

BRIEF DESCRIPTION OF VARIOUS EMBODIMENTS OF THE INVENTION

According to various, but not necessarily all, embodiments of the invention there is provided a key clamp for a key cutting apparatus, the key clamp comprising: a first jaw comprising an engagement surface having a widthwise dimension and a lengthwise dimension, wherein the engagement surface comprises a first row of serrations, arranged along a lengthwise edge of the engagement surface, and a second row of serrations; and a second jaw having an engagement surface comprising a row of serrations for location, in the widthwise dimension, between the first row of serrations in the first jaw and the second row of serrations in the first jaw.

The serrations may be substantially pyramid-shaped in the first row of serrations in the engagement surface of the first jaw, in the second row of serrations in the engagement surface of the first jaw, and/or in the row of serrations in the engagement surface of the second jaw.

Serrations in the first and second rows of serrations in the first jaw may be arranged in columns.

The row of serrations in the engagement surface of the second jaw may be for location, in the lengthwise dimension, between adjacent serrations in the first row of serrations and/or between adjacent serrations in the engagement surface of the second row of serrations.

The apexes of first row of serrations may be positioned within 0.5 mm of the lengthwise edge. In some implementations, the apexes of the first row of serrations is positioned within 0.3 mm of the lengthwise edge.

The widthwise dimension of the engagement surface of the first jaw may be between 3 mm and 5 mm.

A distance between the apexes of the first row of serrations and the apexes of the second row of serrations may be in the range 2 mm to 3 mm.

The serrations in the first row of serrations in the first jaw, the serrations in the second row of serrations in the first jaw and the serrations in the row of serrations in the second jaw may be curved serrations.

The engagement surface of at least one of the first and second jaws may include a recess shaped to receive a curved shaft of a key. The engagement surface of the first and second jaws may each include a recess shaped to receive a portion of a curved shaft of a key. The or each recess may be substantially v-shaped. The v-shape of the recess(es) may define an angle in the range 100° to 130°. The curved shaft of the key may be a curved shaft of a lever key.

According to various, but not necessarily all, embodiments of the invention there is provided a key cutting apparatus comprising the key clamp described above.

BRIEF DESCRIPTION OF THE DRAWINGS

For a better understanding of various examples of embodiments of the present invention reference will now be made by way of example only to the accompanying drawings in which:

FIGS. 6A and 6B illustrate perspective views of a key clamp comprising the first and second jaws illustrated in FIGS. 3A to 5B.

DETAILED DESCRIPTION OF VARIOUS EMBODIMENTS OF THE INVENTION

Embodiments of the invention relate to a key clamp for a key cutting apparatus. The key cutting apparatus may be configured to image a key to be replicated in two or three dimensions in order to determine the shape to which a key blank should be cut. Following imaging, the key cutting apparatus is configured to obtain an appropriate key blank and cut the key blank to replicate the imaged key.

Figure 1A:
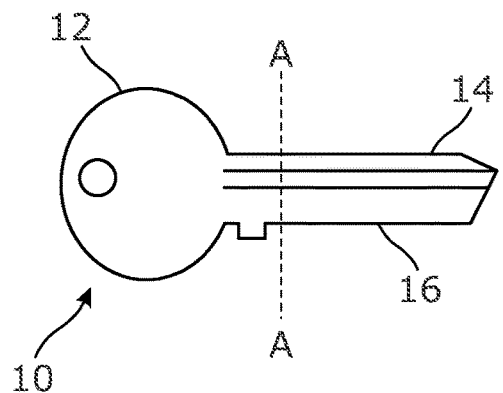
FIG. 1A illustrates an elevation of a single-edged cylinder key blank.

Many different types of key (and therefore many different types of key blank) exist. Some examples of key blanks are illustrated in FIGS. 1A to 1E. FIG. 1A illustrates a single-edged cylinder key blank 10 comprising a head 12 and a shaft 14. An edge 16 of the shaft 14 is cut to replicate a key. In the illustrated example, the head 12 of the cylinder key blank 10 is substantially flat, but the shaft 14 is not. The depth of the head 12 (i.e. in the dimension extending into the page) is substantially the same as the depth of the shaft 14. FIG. 2A illustrates a cross section of the single-edged cylinder key blank 10 through the line A-A illustrated in FIG. 1A.

Figure 1B:
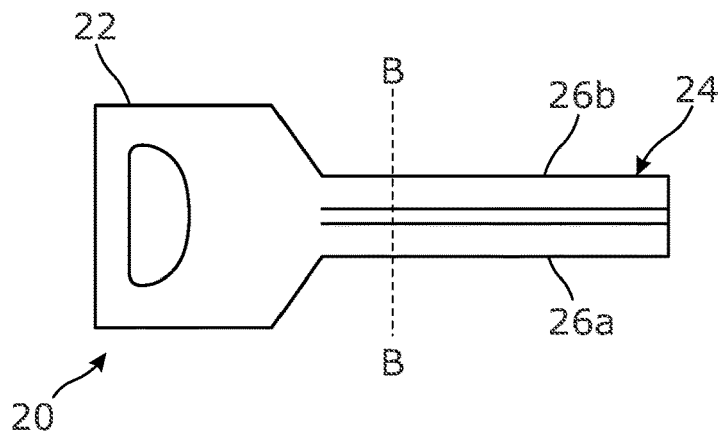
FIG. 1B illustrates an elevation of a double-edged cylinder key blank.
Figure 2A:
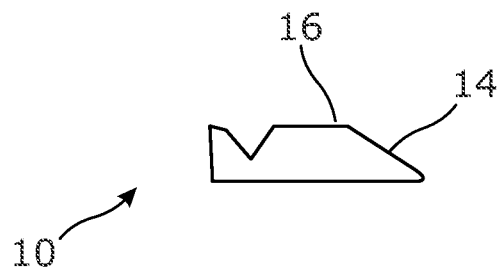
FIG. 2A illustrates a cross section of the single-edged cylinder key blank illustrated in FIG. 1A through the line A-A in FIG. 1A.
Figure 2B:
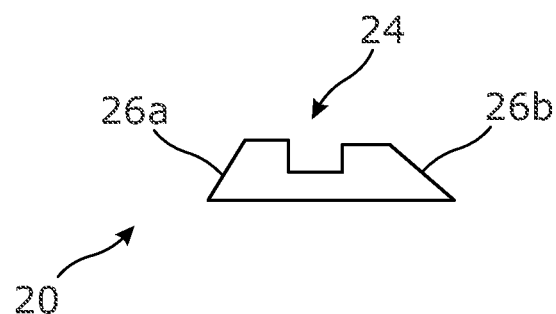
FIG. 2B illustrates a cross section of the double-edged cylinder key blank illustrated in FIG. 2A through the line B-B in FIG. 1B.

FIG. 1B illustrates a double-edged cylinder key blank 20 comprising a head 22 and a shaft 24. First and second edges 26a, 26b of the shaft 24 are cut to replicate a key. In the illustrated example, the head 22 of the cylinder key blank 20 is substantially flat, but the shaft 24 is not. The depth of the head 22 (i.e. in the dimension extending into the page) is substantially the same as the depth of the shaft 24. FIG. 2B illustrates a cross section of the double-edged cylinder key blank 20 through the line B-B illustrated in FIG. 1B.

Figure 1C:
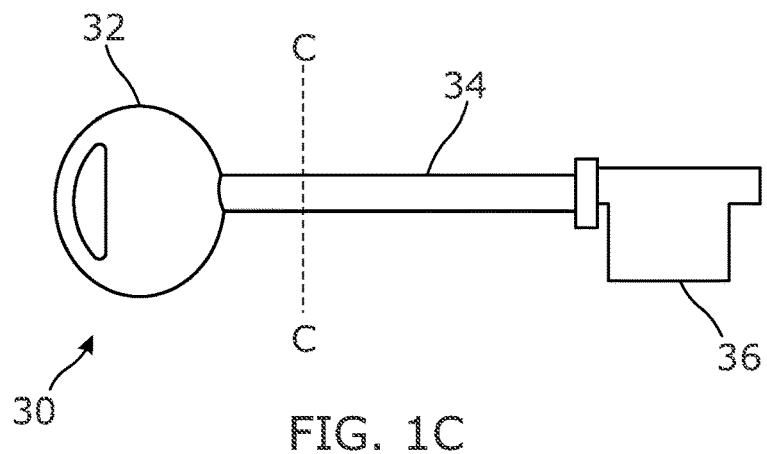
FIG. 1C illustrates an elevation of a lever key blank.
Figure 2C:
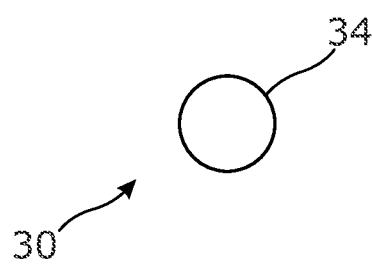
FIG. 2C illustrates a cross section of the lever key blank illustrated in FIG. 1C through the line C-C illustrated in FIG. 1C.

FIG. 1C illustrates an example of a lever key blank 30. The lever key blank 30 has a head 32 and a shaft 34. The depth of the head 32 is smaller than the depth of the shaft 34. A blade 36 to be cut is located at the opposite end of the shaft 34 to the head 32. The head 32 of the lever key blank 30 in this example is substantially flat and the shaft 34 is substantially cylindrical. FIG. 2C illustrates a cross-section of the shaft 34 through the line C-C illustrated in FIG. 1C.

Figure 1D:
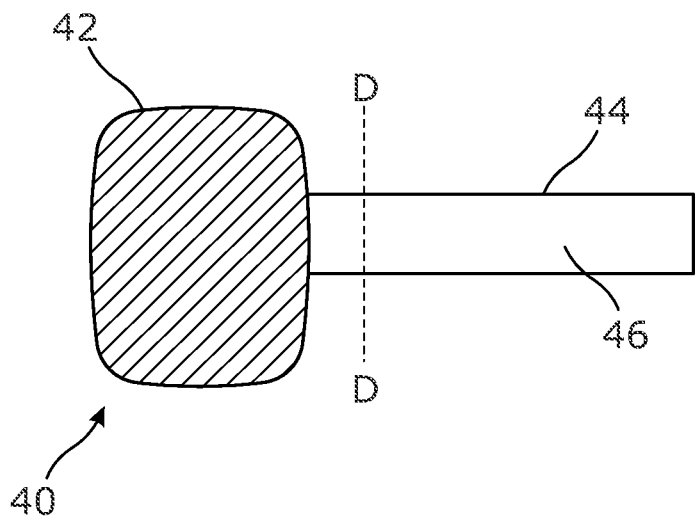
FIG. 1D illustrates an elevation of a dimple key blank.
Figure 2D:
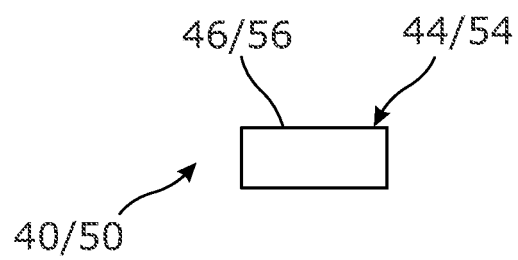
FIG. 2D illustrates a cross section of the dimple key blank or the high security key blank through the line D-D or E-E illustrated in FIG. 1D or FIG. 1E.

FIG. 1D illustrates an example of a dimple key blank 40. The dimple key blank 40 has a head 42 and a shaft 44. The head 42 may be made from a plastics material and may have a much greater depth than the shaft 44. The shaft 44 of the dimple key blank 40 is a rectangular prism shape. FIG. 2D illustrates the cross section of the shaft 44 through the line D-D illustrated in FIG. 1D. The dimple key blank 40 is cut by cutting cone-shaped dimples into the upper surface 46 of the shaft 44 and/or the lower surface of the shaft 44 (that is, the surfaces defined by the length and width of the shaft 44).

Figure 1E:
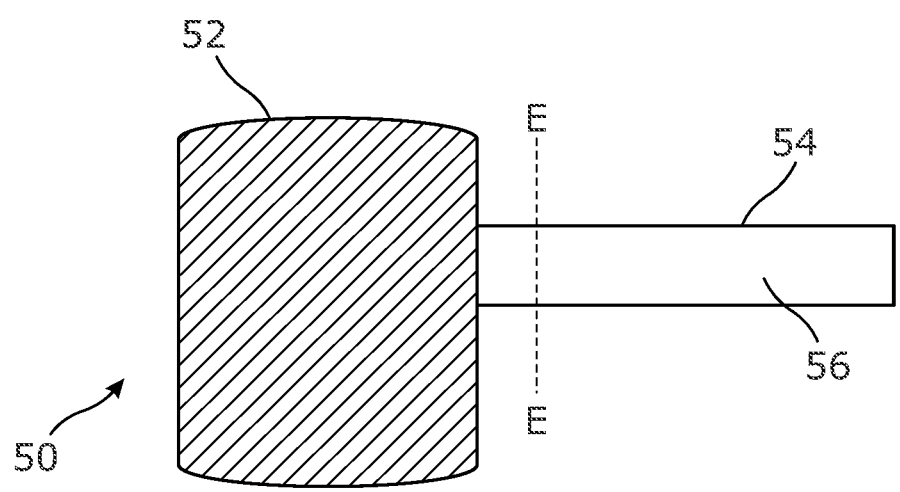
FIG. 1E illustrates an elevation of a high security key blank.

FIG. 1E illustrates a high security key blank 50, such as an automotive or residential key blank. The high security key blank 50 comprises a head 52 and a shaft 54. The head 52 may be made from a plastics material and may have a much greater depth than the shaft 54. The shaft 54 of the high security key blank 50 is a rectangular prism shape. FIG. 2D illustrates a cross section of the shaft 54 through the line E-E illustrated in FIG. 1E. The high security key blank 50 is cut by cutting a track into the upper surface 56 of the shaft 54 and/or a lower surface of the shaft 54 (that is, the surfaces defined by the length and the width of the shaft 54).

Figure 2E:
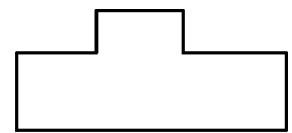
FIG. 2E illustrates another example of a cross section of a key blank.
Figure 2F:
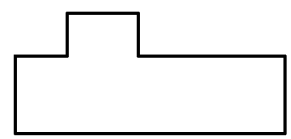
FIG. 2F illustrates a further cross section of a key blank.

It will be appreciated from the above description that keys and key blanks come in many different shapes and sizes. Indeed, there are a number of other different key types beyond those that are illustrated in FIGS. 1A to 2D. FIGS. 2E and 2F illustrate examples of possible cross sections of key shafts of other key blanks 60, 70. It will also be appreciated from viewing FIGS. 2A to 2E that the shafts of different types of keys might be symmetrical or non-symmetrical.

Embodiments of the invention relate to a key clamp that is configured to grasp any type of key blank, either at its head or its shaft. The inventors of the present invention have devised jaws 100, 200 for a key clamp that have engagement surfaces 102, 202 which are able to grasp a key blank 10, 20, 30, 40, 50, 60, 70 and hold that key blank 10, 20, 30, 40, 50, 60, 70 in an orientation that is consistent each time a different key blank 10, 20, 30, 40, 50, 60, 70 is grasped and held, as required for accurate automated cutting in a key cutting apparatus. If such consistency were not present in the manner that a key blank 10, 20, 30, 40, 50, 60, 70 is held, consistently accurate automated key surface cutting could not be achieved.

The key clamp comprises a first jaw 100 and a second jaw 200. The first jaw 100 is illustrated in FIGS. 3A to 3F and the second jaw 200 is illustrated in FIGS. 4A to 4F. FIGS. 5A and 5B illustrate both jaws 100, 200. The first jaw 100 may be a lower jaw and the second jaw 200 may be an upper jaw. The first and second jaws 100, 200 each comprise engagement surfaces 102, 202 which contact the shaft 14, 24, 34, 44, 54 when a key blank 10, 20, 30, 40, 50, 60, 70 is held. The engagement surfaces 102, 202 of the jaws 100, 200 oppose each other and hold a key blank 10, 20, 30, 40, 50, 60, 70 therebetween.

Cartesian coordinate axes 80 are provided in each of FIGS. 3A to 5B to help the skilled reader to orientate the figures relative to one another.

Figure 3A:
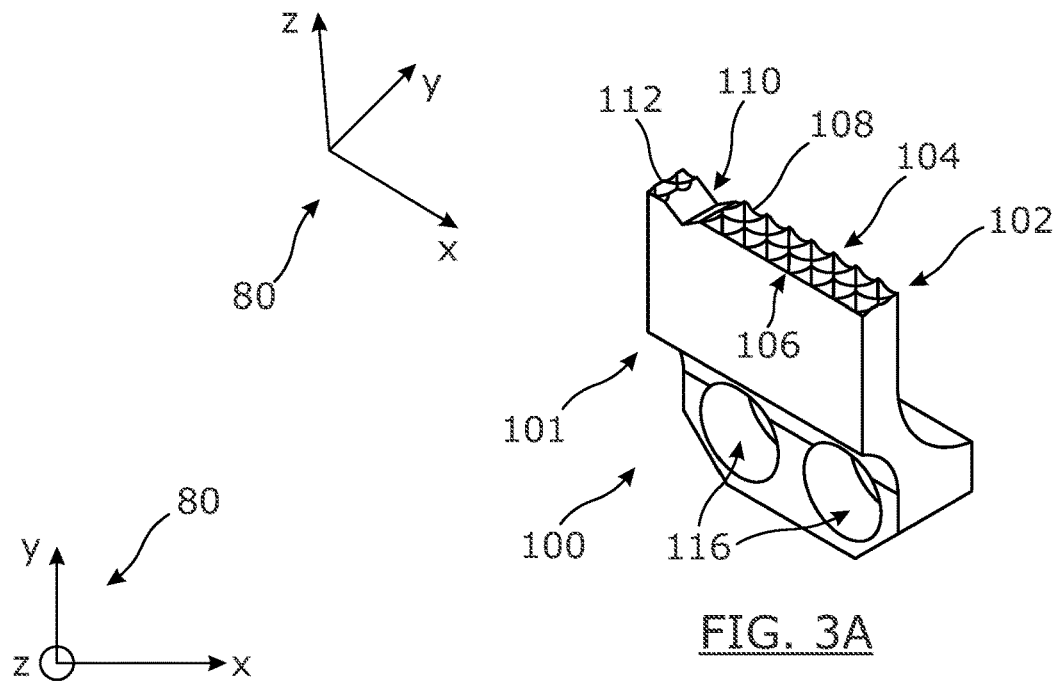
FIG. 3A illustrates a perspective view of a first, lower, jaw of a key clamp.
Figure 3B:
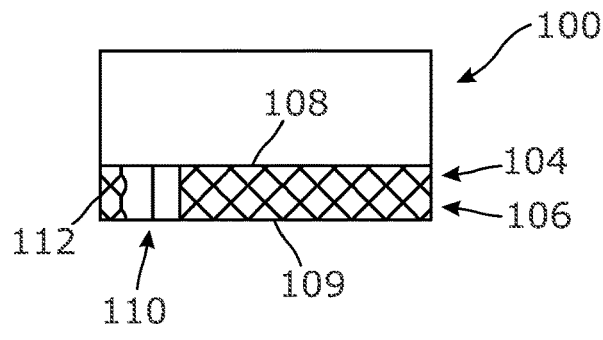
FIG. 3B illustrates a plan view of an engagement surface of the first jaw.

FIG. 3A illustrates a perspective view of the first, lower, jaw 100 of the key clamp. The first jaw 100 has a body 101. The first jaw 100 has a plurality of bores 116 in the body 101 that are arranged to enable the first jaw 100 to be connected adjacent the second jaw 200 in a key cutting apparatus, such that the engagement surfaces 102, 202 of the jaws 100, 200 face each other. Once connected, the first jaw 100 may be configured to move in each of the x, y and z dimensions identified by the Cartesian coordinate axes 80.

The engagement surface 102 of the first jaw 100 has a widthwise dimension that is aligned with the y-axis in FIG. 3A and a lengthwise dimension that is aligned with the x-axis. The engagement surface 102 comprises a plurality of serrations. In the illustrated example, the serrations are curved serrations that define a series of alternating apexes and nadirs. The serrations are three-dimensional in the sense that they are tapered in both the widthwise dimension and the lengthwise dimension. Each serration has the shape of a pyramid, in which the surfaces extending to the apex are curved.

The serrations are arranged in rows and columns. In the illustrated example, the engagement surface 102 comprises a first row of serrations 104 and a second row of serrations 106. The serrations in a particular row are arranged in a line. The rows of serrations extend in the dimension defined by the x-axis in the figures. The serrations arranged in a particular column are also linearly aligned. The columns of serrations extend in the dimension defined by the y-axis in the figures. The two rows of serrations 104, 106 in the engagement surface 102 are the only rows of serrations 104, 106 (in the illustrated example). There are no further serrations. The first row of serrations 104 is arranged along a first lengthwise edge 108 of the engagement surface 102. A second lengthwise edge is labelled with the reference numeral 109 in FIG. 3B.

The engagement surface 102 further comprises a recess 110 that is substantially v-shaped. It can be seen in FIGS. 3A and 3B that the recess 110 is located near a widthwise edge 112 of the engagement surface 102. The recess 110 defines a gap in the serrations, both in the first row 104 and the second row 106.

Figure 3C:
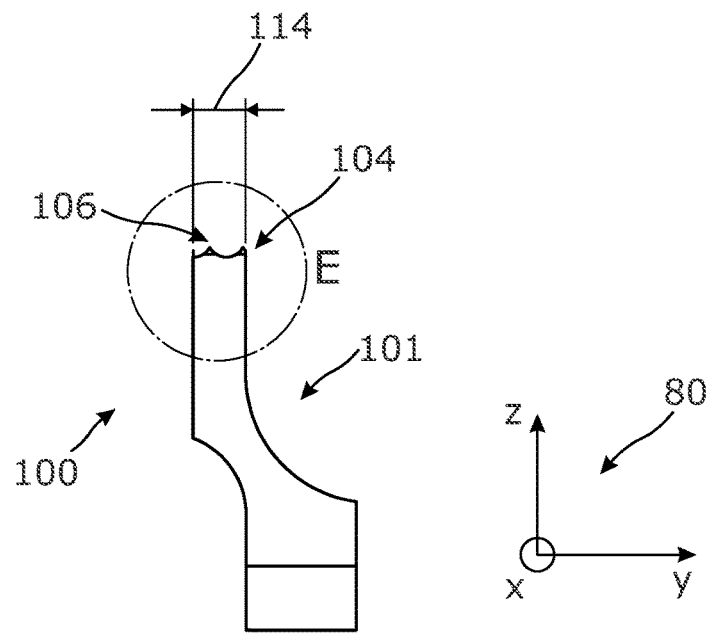
FIG. 3C illustrates a side view of the first jaw.
Figure 3D:
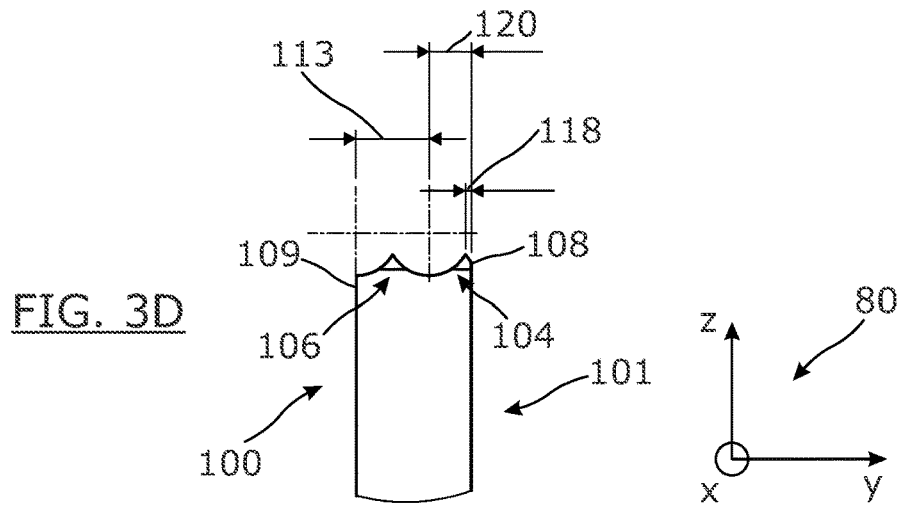
FIG. 3D illustrates the detail E illustrated in FIG. 3C.

FIG. 3C illustrates a side view of the first jaw 100. FIG. 3D illustrates the detail E marked with a circle in FIG. 3C. The widthwise extent of the engagement surface 102 of the first jaw 100 is indicated by the reference numeral 114 in FIG. 3C. It may be in the range 3 mm to 5 mm, such as 4.1 mm.

The first row of serrations 104 is located substantially at the first lengthwise edge 108 of the engagement surface 102 in the first jaw 100. FIG. 3D illustrates the proximity of the first row of serrations 104 to the first lengthwise edge 108. The apexes of the first row of serrations 104 are located very close to the first lengthwise edge 108. In some examples, the apexes are positioned within 0.5 mm of the first lengthwise edge 108. In some further examples, the apexes are positioned within 0.3 mm of the lengthwise edge. In a preferred embodiment, the apexes are positioned 0.2 mm from the first lengthwise edge 108. The dimension 118 in FIG. 3D indicates the distance of the apexes of the first row of serrations 104 from the first lengthwise edge 108.

The distance between the first row of serrations 104 and the second row of serrations 106 (in the dimension defined by the y-axis) may be in the range 2 mm to 3 mm, such as 2.6 mm. This distance is the same as that labelled with the reference numeral 113 in FIG. 3D, which relates to the distance from the second lengthwise edge 109 to the nadir separating the apexes of the first row of serrations 104 and the second row of serrations 106.

FIG. 3D illustrates a distance 120 from the lengthwise edge 108 to the nadir separating the apexes of the first row of serrations 104 and the second row of serrations 106. In some examples this distance is in the region of 1 mm to 2 mm. It may, for instance, be 1.5 mm.

Figure 3E:
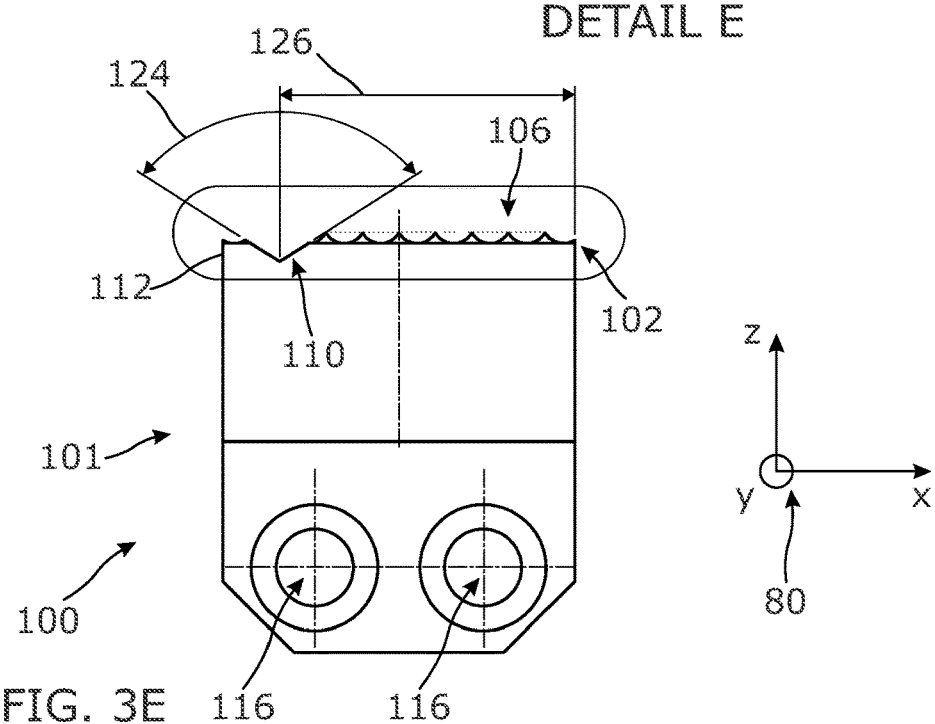
FIG. 3E illustrates a front view of the first jaw.
Figure 3F:
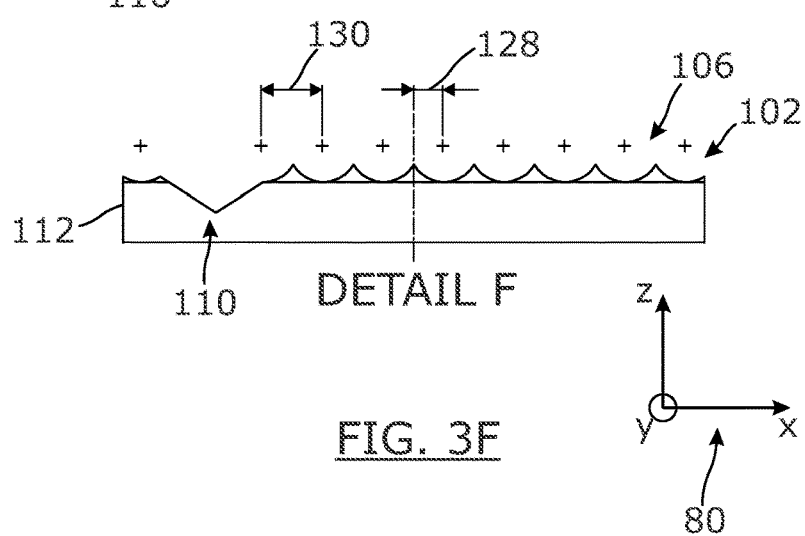
FIG. 3F illustrates the detail F illustrated in FIG. 3E.

FIG. 3E illustrates a front view of the first jaw 100. FIG. 3F illustrates the detail F illustrated in FIG. 3E. The substantially v-shaped recess 110 comprises two angled planar surfaces that meet at a nadir. The angle at which the planar surfaces are positioned relative to each other might be in the range 100 degrees to 130 degrees. In some examples it might be in the range 110 degrees to 120 degrees. In a preferred embodiment, the angle range might be 115 degrees. The distance 126 from the nadir of the recess 110 to the widthwise edge of the engagement surface 102 furthest away from the recess 110 might be in the range 15 mm to 30 mm. In a preferred embodiment, the distance 126 is 21 mm.

The distance 128 between and a nadir and an adjacent apex in the second row of serrations 106 is illustrated by the reference numeral 128 in FIG. 3F and might be in the range 1.1 mm to 1.5 mm. In a preferred embodiment, the distance is 1.3 mm. The distance 128 might be the same in the first row of serrations 104.

The distance between adjacent nadirs in the second row of serrations 106 is illustrated by the reference numeral 130 in FIG. 3F and might be in the range 2 mm to 3 mm. In a preferred embodiment, it is 2.6 mm. The distance 130 might be the same in the first row of serrations 104.

Figure 4A:
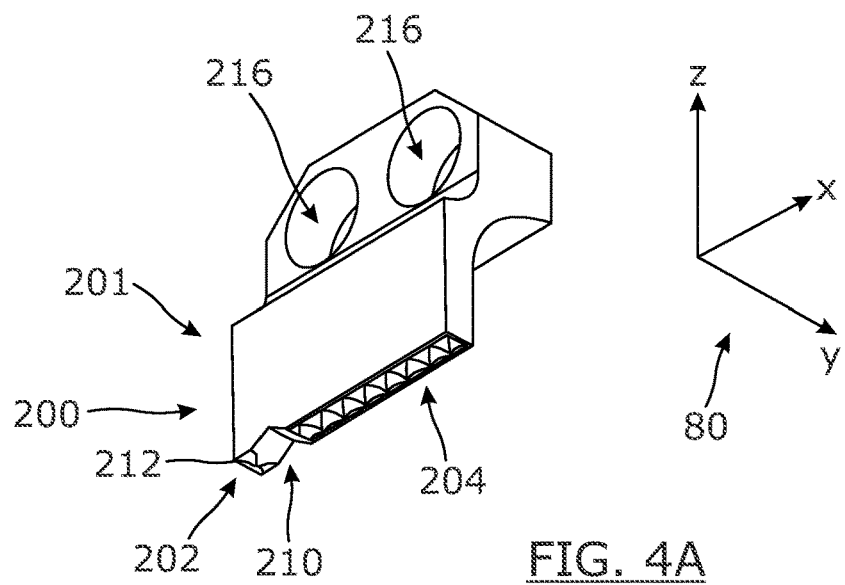
FIG. 4A illustrates a perspective view of a second, upper, jaw of the key clamp.
Figure 4B:
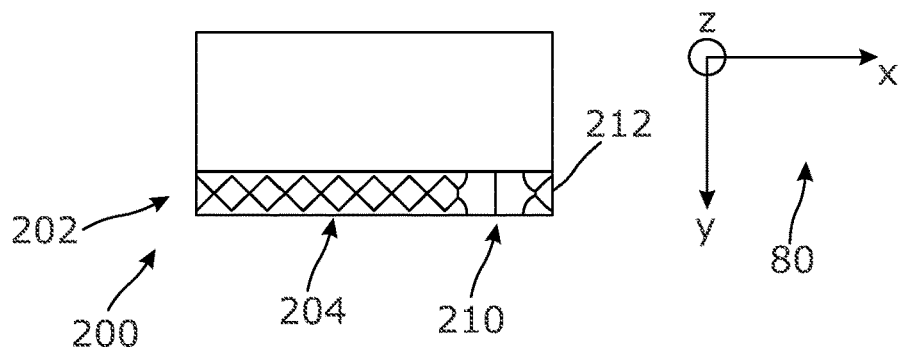
FIG. 4B illustrates an underside view of an engagement surface of the second jaw.
Figure 5A:
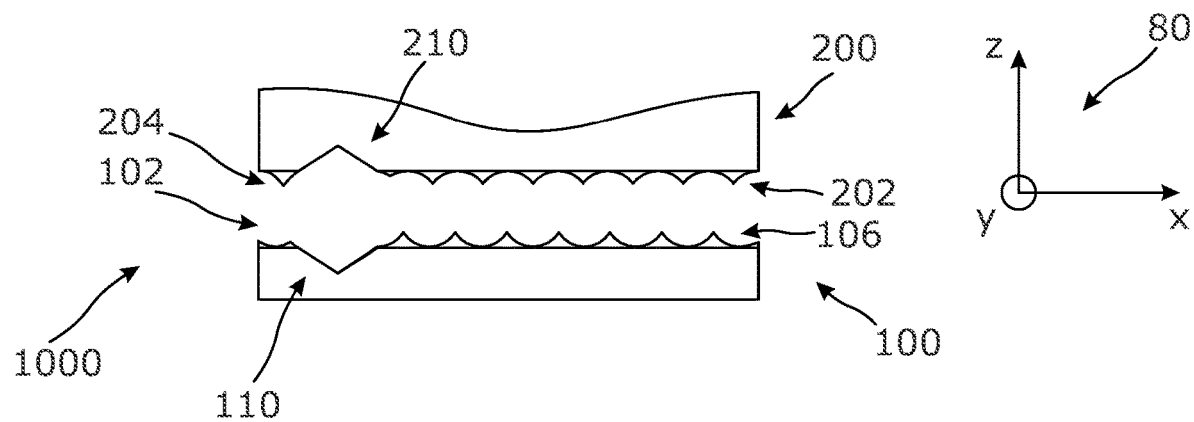
FIG. 5A illustrates a front view of a portion of the first jaw opposing a portion of the second jaw.
Figure 5B:
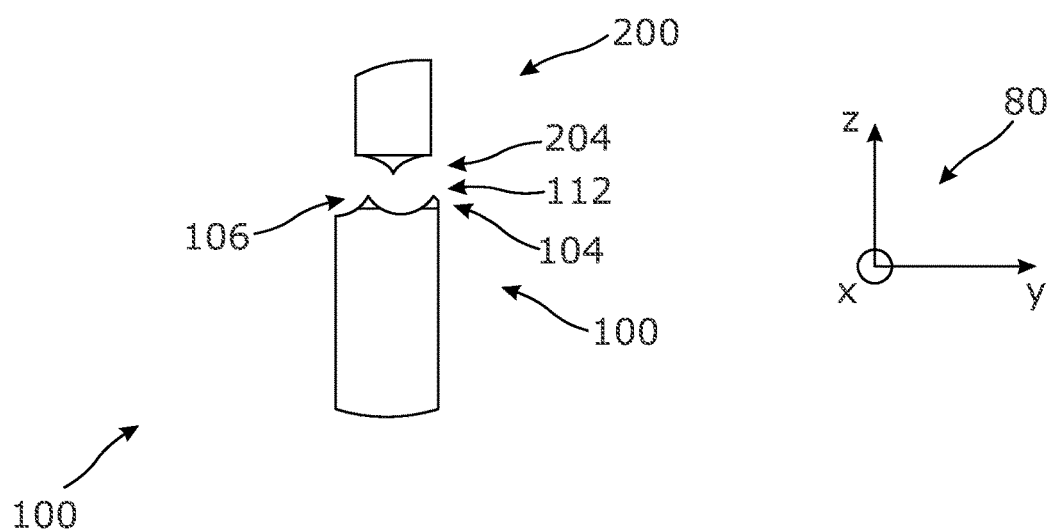
FIG. 5B illustrates a side view of a portion of the first jaw opposing a portion of the second jaw.

FIG. 4A illustrates a perspective view of the second, upper, jaw 200 and its engagement surface 202. FIG. 4B illustrates an underside view of the second jaw 200, showing the engagement surface 202.

The second jaw 200 has a body 201. The second jaw 200 has a plurality of bores 216 in the body 201 that are arranged to enable the second jaw 200 to be connected adjacent the first jaw 100 in a key cutting apparatus, such that the engagement surfaces 102, 202 of the jaws 100, 200 face each other. Once connected, the second jaw 200 may be configured to move in each of the x, y and z dimensions identified by the Cartesian coordinate axes 80.

The second jaw 200 comprises a plurality of serrations 204. In the illustrated example, the serrations 204 are curved serrations that define a series of alternating apexes and nadirs. The serrations 204 are three-dimensional in the sense that they are tapered in both the widthwise dimension and the lengthwise dimension. Each serration 204 has the shape of a pyramid, in which the surfaces extending to the apex are curved.

The plurality of serrations 204 is arranged in a single row. The row is aligned with the lengthwise dimension of the engagement surface 202. In the illustrated example, the engagement surface 202 further comprises a recess 210 that is substantially v-shaped.

It can be seen in FIGS. 4A and 4B that the recess 110 is located near a widthwise edge 212 of the engagement surface 202. The recess 210 defines a gap in the serrations 204.

Figure 4C:
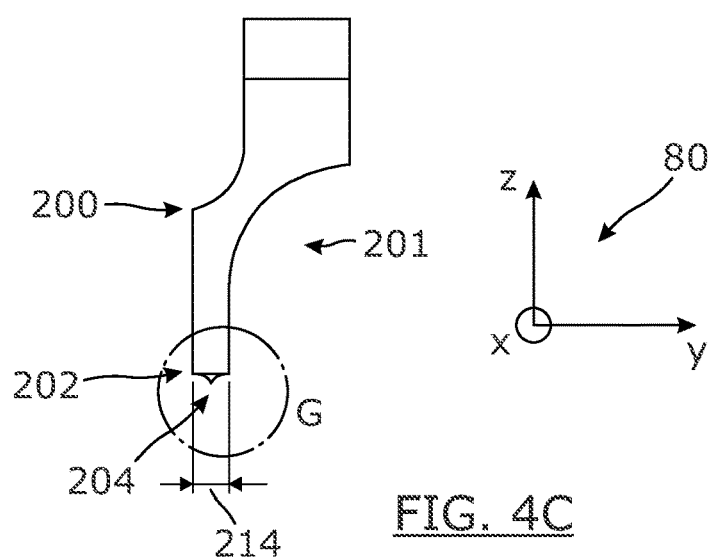
FIG. 4C illustrates a side view of the second jaw.

FIG. 4C illustrates a side view of the second jaw 200. The widthwise extent of the engagement surface 202 of the second jaw 200 is illustrated by the reference numeral 214 in FIG. 4C. In some embodiments, the widthwise extent of the second jaw 200 is smaller than the widthwise extent of the engagement surface 102 of the first jaw 100. For example, the widthwise extent 214 of the engagement surface 202 might be in the range 2 mm to 4 mm. For example, it might be 3 mm.

Figure 4D:
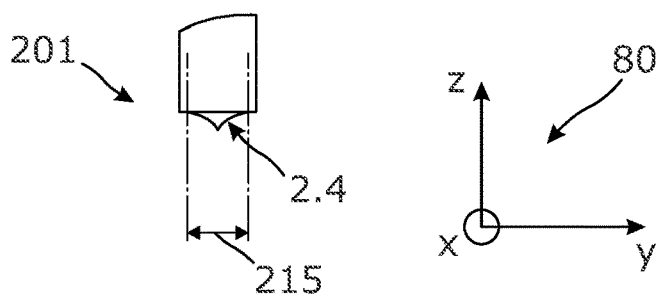
FIG. 4D illustrates the detail G illustrated in FIG. 4C.

FIG. 4D illustrates the detail G illustrated in FIG. 4C. A distance between a lengthwise edge of the engagement surface 202 and a mid-point of the engagement surface 202 in the widthwise dimension is illustrated by the reference numeral 215 in FIG. 4D. In a preferred embodiment, this might be 2.5 mm.

Figure 4E:
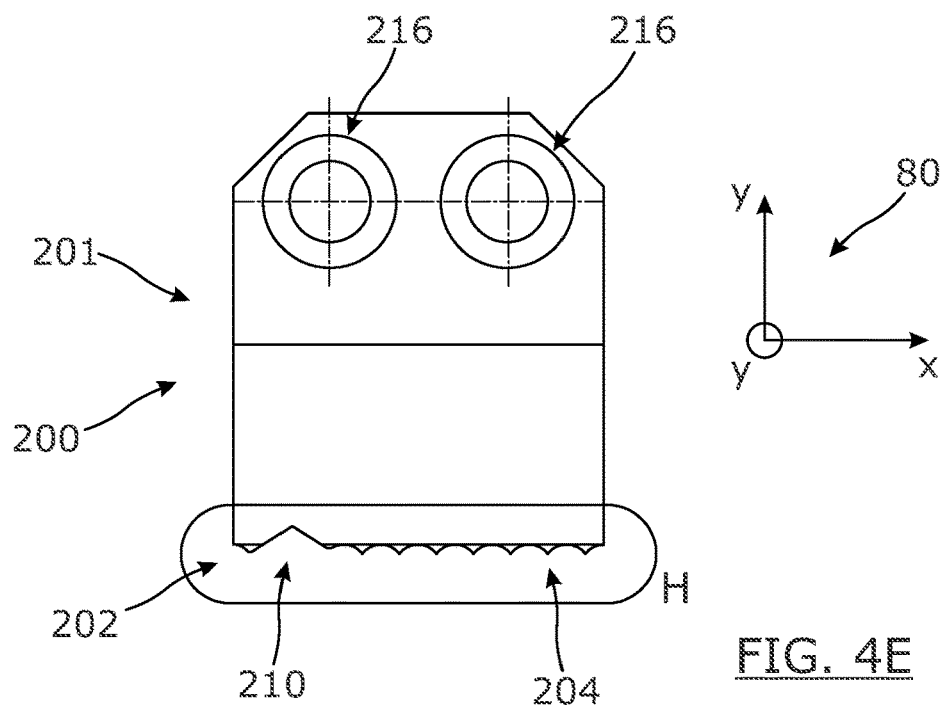
FIG. 4E illustrates a front view of the second jaw.
Figure 4F:
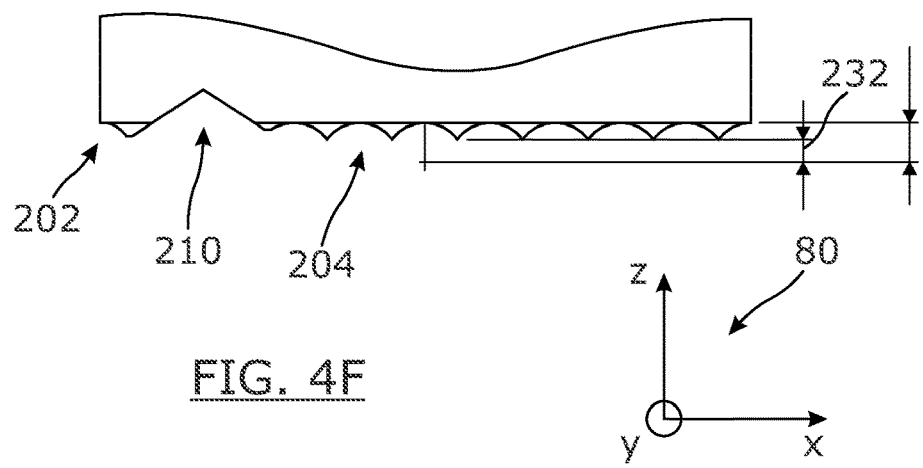
FIG. 4F illustrates the detail H illustrated in FIG. 4E.

FIG. 4E illustrates a front view of the second jaw 200. FIG. 4F illustrates the detail H illustrated in FIG. 4E. The height of the serrations 204 in the engagement surface 202 is indicated in FIG. 4F by the reference numeral 232. The height of the serrations might, for example, be in the range 0.4 mm to 1 mm. In a preferred embodiment, the height of the serrations is 0.67 mm. The height of the serrations in the engagement surface 102 of the first jaw 100 might be the same.

The substantially v-shaped recess 210 comprises two angled planar surfaces that meet at a nadir. The angle at which the planar surfaces are positioned relative to each other might be in the range 100 degrees to 130 degrees. In some examples it might be in the range 110 degrees to 120 degrees. In a preferred embodiment, the angle range might be 115 degrees.

FIG. 5A illustrates a front view of a portion of the key clamp 1000 in which a portion of the first jaw 100 is shown opposing a portion of the second jaw 200. It can be seen that the recess 110 in the first jaw 100 opposes the recess 210 in the second jaw 200. It can also be seen in FIG. 5A that the serrations 104, 106 in the engagement surface 102 of the first jaw 100 are offset from the serrations 204 in the engagement surface 202 of the second jaw 200 in the widthwise dimension (which is aligned with the x-axis). Apexes of the serrations 104, 106 in the engagement surface 102 of the first jaw 100 are aligned in the widthwise dimension with nadirs in the engagement surface 202 in the second jaw 200. Apexes of the serrations 204 in the engagement surface 202 of the second jaw 200 are aligned in the widthwise dimension with nadirs in the engagement surface 102 in the first jaw 100. The nadirs are located, in the widthwise dimension, between adjacent serrations in a particular row 104, 106 of serrations.

FIG. 5B illustrates a side view of a portion of the first jaw 100 opposing a portion of the second jaw 200. It can be seen in FIG. 5B that the serrations 204 in the engagement surface 202 of the second jaw 200 are offset relative to the serrations 104, 106 in the engagement surface 102 in the first jaw 100 in the lengthwise dimension (which is aligned with the y-axis). That is, apexes of the serrations 204 in the engagement surface 202 of the second jaw 200 are aligned in the lengthwise dimension with nadirs in the engagement surface 102 in the first jaw 100. The nadirs are located between the adjacent rows 104, 106 of serrations in the first engagement surface 102.

Figure 6A:
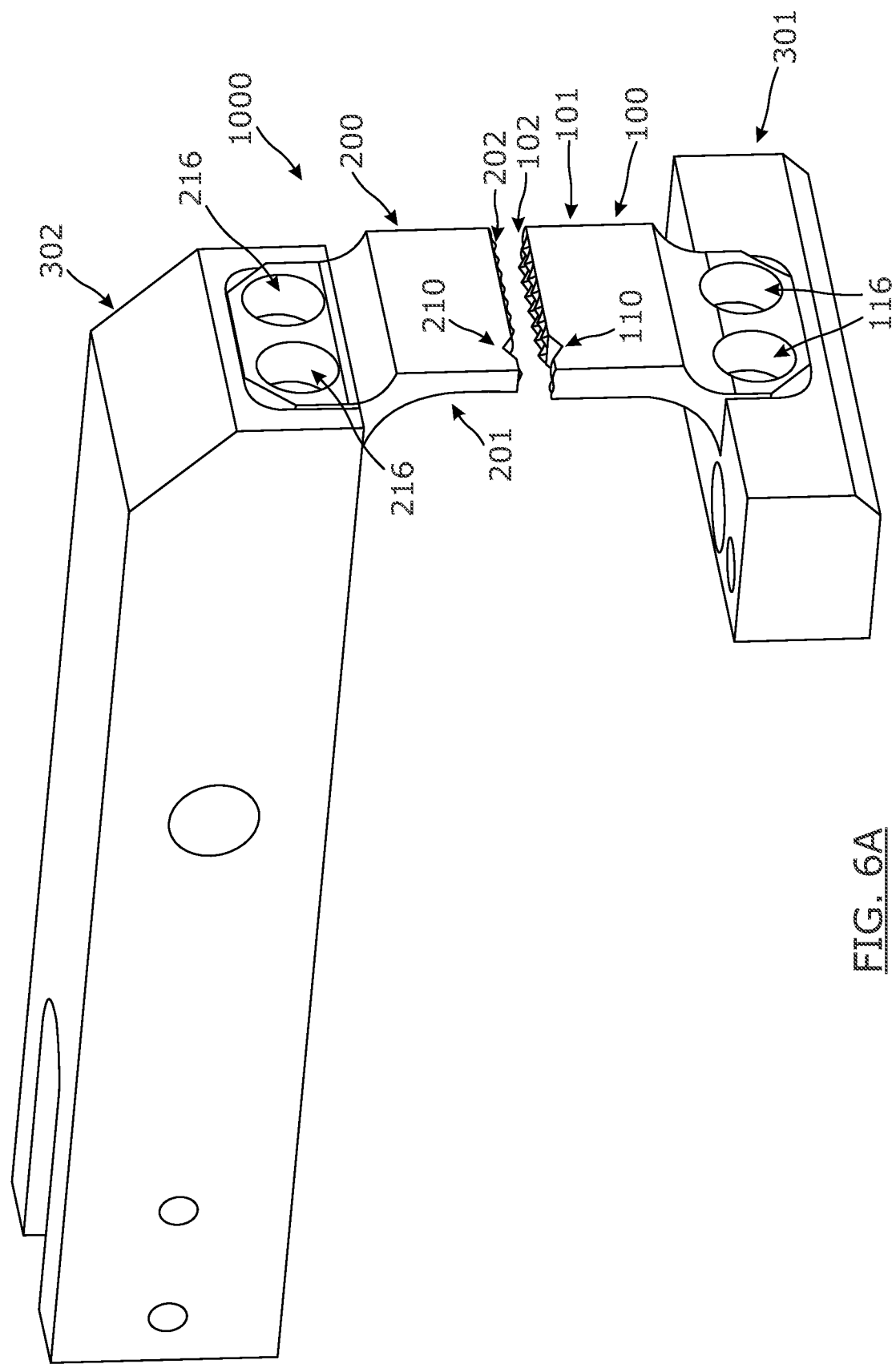

FIGS. 6A and 6B illustrate perspective views of the key clamp 1000 comprising the first jaw 100 and the second jaw 200 described above. In the illustrated example, the first jaw 100 is mounted to a first mount 301 of a key cutting apparatus and the second jaw is mounted to a second mount 302 of a key cutting apparatus. The bores 116, 216 may be used to mount the jaws 100, 200 to the mounts 301, 302, for instance, using fasteners.

Figure 7A:
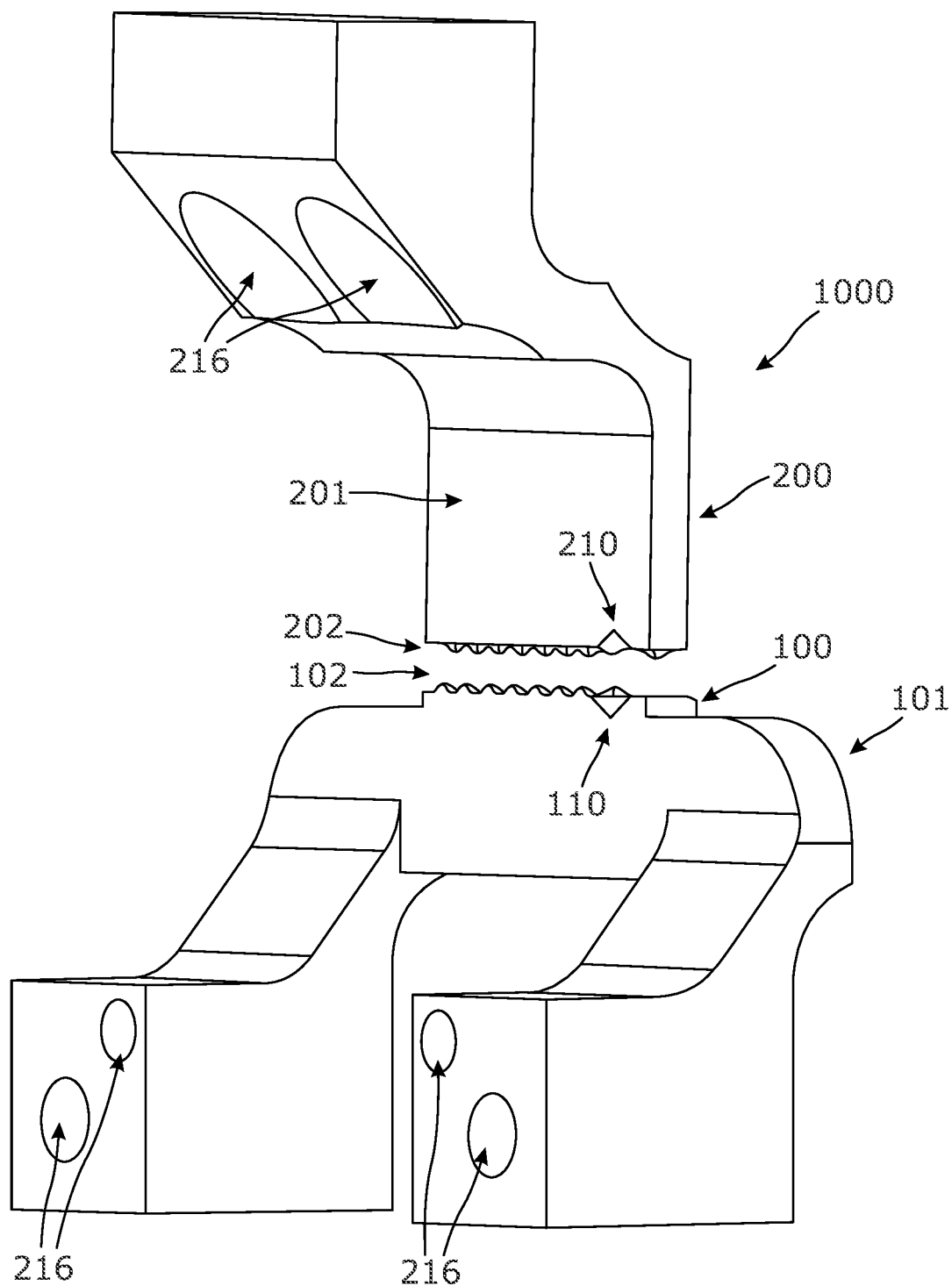
FIGS. 7A and 7B illustrate perspective views of another example of the key clamp comprising first and second jaws.
Figure 7B:
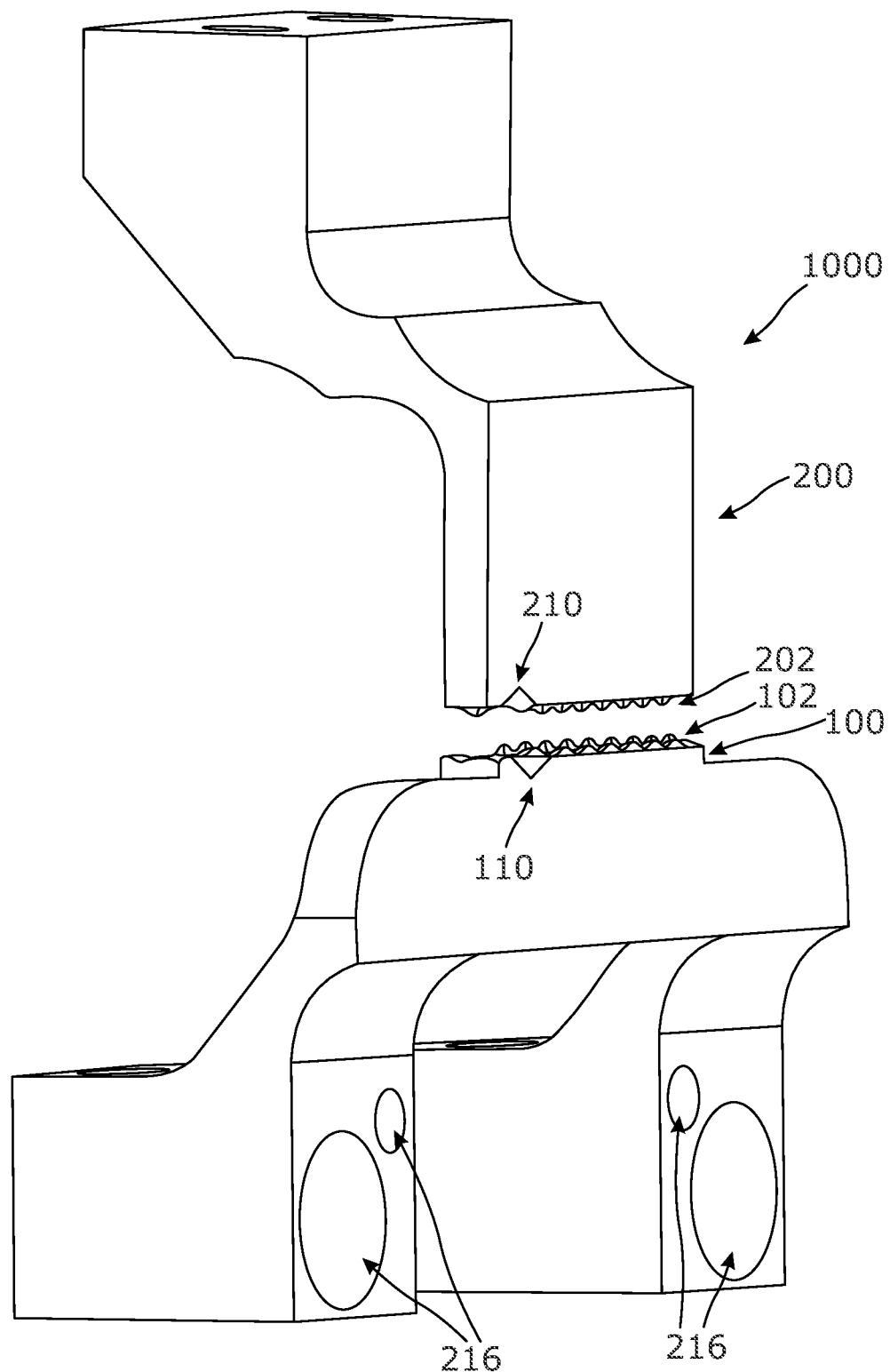

FIGS. 7A and 7B illustrate another example of the key clamp 100. In this example, the first and second jaws 100, 200 are the same as those described above, but the body 101, 201 of each jaw 100, 200 is shaped differently and the location of the bores 116, 216 for mounting the jaws 100, 200 in a key cutting apparatus are different. The engagement surfaces 102, 104 of the jaws 100, 200 illustrated in FIGS. 7A and 7B are, however, the same as those described above in relation to the jaws 100, 200 illustrated in FIGS. 3A to 6B.

The key clamp 1000 of the present invention is advantageously able to grasp and hold each key blank at its head or its shaft in a consistent, repeatable way to enable accurate key cutting to be performed consistently. This is achieved by consistently holding the shaft "flat" in a plane defined by the x and y dimensions in the figures. The head/shaft that the key clamp 1000 is able to grasp and hold may take a variety of different forms, including those illustrated in FIGS. 1A to 2F.

In order to grasp and hold a key blank 10, 20, 30, 40, 50, 60, 70 the head or the shaft of the key blank 10, 20, 30, 40, 50, 60, 70 is temporarily held between the jaws 100, 200 while at least one jaw 100, 200 moves towards the other jaw 100, 200 in the z-dimension. The key blank 10, 20, 30, 40, 50, 60, 70 is moved around by the key cutting apparatus in order to cut it while it is held firmly in the key clamp 100.

Each of the single-edged and double edged cylinder key blanks 10, 20 illustrated in FIGS. 1A and 1B might, for example, be held by its head 12, 22 to enable those blanks 10, 20 to enable the edge(s) 16, 26a, 26b of the shaft 14, 24 to be cut all the way along the edges 16, 26a, 26b, including at a position close to the head 12, 22. These key blanks 10, 20 have flat heads with a relatively small depth, enabling them to be gripped in this manner. Other key blanks with a flat head having a small depth may be held in the same manner.

The v-shaped recesses 110, 210 in the engagement surfaces 100, 200 of the jaws 100, 200 are for receiving and gripping the shaft 34 of a lever key blank 30, which is substantially cylindrical in shape. Each recess 110, 210 receives a portion of the shaft 34.

Each of the key blanks 40, 50 illustrated in FIGS. 1D and 1E (e.g. with wider plastic heads) is held at its shaft 44, 54 rather than its head 42, 52 due to the variety of sizes of heads that might exist. While the heads 12, 22 of cylinder key blanks 10, 20 while might be flat and relatively easy to grasp and hold, the same is not true for dimple key blanks 40 and high security key blanks 50.

The apexes of the serrations located in the first row of serrations 104 positioned along the lengthwise edge 108 in the engagement surface 102 of the first, lower, jaw 100 are for providing support to the underside of the head 12, 22 or shaft 44, 54. In situations in which the shaft 44, 54 is gripped, the serrations 104 provide support at a location that is proximate the intersection between the shaft 44, 54 and the head 42, 52 of the key blank 40, 50.

The widthwise dimension (aligned with the y axis in the figures) of the engagement surfaces 102, 202 has been carefully selected to allow the shaft of certain key blanks, such as the shafts 44, 54 of dimple key blanks 40 and high security key blanks 50, to be cut within a distance of about 5 mm from the end of the shaft 44, 54 that is adjacent the head 42, 52 of the key blank 40, 50. If cutting could not be performed this close to the key head 42, 52, it would not be possible to replicate some keys.

Although embodiments of the present invention have been described in the preceding paragraphs with reference to various examples, it should be appreciated that modifications to the examples given can be made without departing from the scope of the invention as claimed. For example, the key clamp 1000 may be used to grasp and hold key blanks having a different form from those illustrated in FIGS. 1A to 2F. The body 101, 201 of the each of the jaws 101, 201 may be different from that described above and illustrated in the figures, and the manner in which the jaws 100, 200 are mounted in a key cutting apparatus may be different.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

We claim:

1. A key cutting apparatus comprising a key clamp, the key clamp comprising:
    a first jaw comprising an engagement surface for engaging a key, the engagement surface having a widthwise dimension and a lengthwise dimension, wherein the engagement surface comprises a first row of serrations, arranged along a lengthwise edge of the engagement surface, and a second row of serrations adjacent, in the widthwise dimension, to the first row of serrations; and a second jaw having an engagement surface for engaging the key so as to clamp the key between the two engagement surfaces, the second jaw engagement surface comprising a row of serrations arranged such that when the key is held by the first jaw and the second jaw, the row of serrations in the second jaw is located, in the widthwise dimension, between the first row of serrations in the first jaw and the second row of serrations in the first jaw.

2. The key cutting apparatus of claim 1, wherein the serrations are substantially pyramid-shaped in the first row of serrations in the engagement surface of the first jaw, in the second row of serrations in the engagement surface of the first jaw, and/or in the row of serrations in the engagement surface of the second jaw.

3. The key cutting apparatus of claim 1, wherein serrations in the first and second rows of serrations in the first jaw are arranged in columns.

4. The key cutting apparatus of claim 1, wherein the row of serrations in the engagement surface of the second jaw is arranged such that when the key is held by the first jaw and the second jaw, the row of serrations in the second jaw is located, in the lengthwise dimension, between adjacent serrations in the first row of serrations and/or between adjacent serrations in the second row of serrations.

5. The key cutting apparatus of claim 1, wherein the apexes of the serrations of the first row of serrations are positioned within 0.5 mm of the lengthwise edge.

6. The key cutting apparatus of claim 1, wherein the apexes of the serrations of the first row of serrations are positioned within 0.3 mm of the lengthwise edge.

7. The key cutting apparatus of claim 1, wherein the widthwise dimension of the engagement surface of the first jaw is between 3 mm and 5 mm.

8. The key cutting apparatus of claim 1, wherein a distance between the apexes of the serrations of the first row of serrations and the apexes of the serrations of the second row of serrations is in the range 2 mm to 3 mm.

9. The key cutting apparatus of claim 1, wherein the serrations in the first row of serrations in the first jaw, the serrations in the second row of serrations in the first jaw and the serrations in the row of serrations in the second jaw are curved serrations.

10. The key cutting apparatus of claim 1, wherein the engagement surfaces of the first and second jaws each include a respective recess shaped to receive a portion of a curved shaft of a key.

11. The key cutting apparatus of claim 10, wherein each of the recesses is substantially v-shaped.

12. The key cutting apparatus of claim 11, wherein the v-shape of each of the recesses defines a respective angle in the range 100° to 130°.

13. The key cutting apparatus of claim 1, wherein the engagement surfaces of the first and second jaws each include a respective recess shaped to receive a portion of a curved shaft of a lever key.

14. A key cutting apparatus comprising a key clamp, the key clamp comprising:

a first jaw comprising an engagement surface for engaging a key, the engagement surface having a widthwise dimension and a lengthwise dimension, wherein the engagement surface comprises a first row of serrations, arranged along a lengthwise edge of the engagement surface, and a second row of serrations adjacent, in the widthwise dimension, to the first row of serrations; and a second jaw having an engagement surface for engaging the key so as to clamp the key between the two engagement surfaces, the second jaw engagement surface comprising a row of serrations arranged such that when the key is held by the first jaw and the second jaw, the row of serrations in the second jaw is located, in the widthwise dimension, between the first row of serrations in the first jaw and the second row of serrations in the first jaw, wherein the engagement surfaces of the first and second jaws each include a respective substantially v-shaped recess shaped to receive a portion of a curved shaft of a key, and wherein the serrations are substantially pyramid-shaped in the first row of serrations in the engagement surface of the first jaw, in the second row of serrations in the engagement surface of the first jaw, and/or in the row of serrations in the engagement surface of the second jaw.

15. A key cutting apparatus comprising a key clamp, the key clamp comprising:

a first jaw comprising an engagement surface for engaging a key, the engagement surface having a widthwise dimension and a lengthwise dimension, wherein the engagement surface comprises a first row of serrations, arranged along a lengthwise edge of the engagement surface, and a second row of serrations adjacent, in the widthwise dimension, to the first row of serrations; and a second jaw having an engagement surface for engaging the key so as to clamp the key between the two engagement surfaces, the second jaw engagement surface comprising a row of serrations located, in the widthwise dimension, between the first row of serrations in the first jaw and the second row of serrations in the first jaw, wherein the row of serrations in the engagement surface of the second jaw is arranged such that when the key is held by the first jaw and the second jaw, the row of serrations in the second jaw is located, in the lengthwise dimension, between adjacent serrations in the first row of serrations and/or between adjacent serrations in the second row of serrations, and wherein the serrations are substantially pyramid-shaped in the first row of serrations in the engagement surface of the first jaw, in the second row of serrations in the engagement surface of the first jaw, and/or in the row of serrations in the engagement surface of the second jaw.

\* \* \* \* \*